US008255722B2

(12) United States Patent
Pedersen et al.

(10) Patent No.: US 8,255,722 B2
(45) Date of Patent: Aug. 28, 2012

(54) MICROCONTROLLER WITH CLOCK GENERATOR FOR SUPPLYING ACTIVATED CLOCK SIGNAL TO REQUESTING MODULE TO CONSERVE POWER

(75) Inventors: Frode Milch Pedersen, Trondheim (NO); Fredrik Larsen, Trondheim (NO); Oyvind Skutlaberg, Tiller (NO)

(73) Assignee: Atmel Corporation, San Jose, CA (US)

( * ) Notice: Subject to any disclaimer, the term of this patent is extended or adjusted under 35 U.S.C. 154(b) by 510 days.

(21) Appl. No.: 12/400,690

(22) Filed: Mar. 9, 2009

(65) Prior Publication Data

US 2010/0229011 A1    Sep. 9, 2010

(51) Int. Cl.
*G06F 1/32* (2006.01)
(52) U.S. Cl. ........................................ 713/322; 713/324
(58) Field of Classification Search ........................ None
See application file for complete search history.

(56) References Cited

U.S. PATENT DOCUMENTS

| | | | | |
|---|---|---|---|---|
| 5,623,234 A | * | 4/1997 | Shaik et al. | 331/49 |
| 6,163,851 A | * | 12/2000 | Yamazoe et al. | 713/600 |
| 6,754,836 B2 | * | 6/2004 | Shimizu et al. | 713/320 |
| 7,203,855 B2 | * | 4/2007 | Chou | 713/320 |

* cited by examiner

*Primary Examiner* — Kenneth Kim
(74) *Attorney, Agent, or Firm* — Fish & Richardson P.C.

(57) ABSTRACT

The disclosed implementations provide for power reduction in microcontrollers by reactivating a clock in the microcontroller for one or more peripheral modules in response to an internal or external trigger event, thus allowing the one or more peripheral modules to respond to events while operating in a low-power sleep mode. In some implementations, one or more peripheral modules in a microcontroller provide a clock request signal to a clock generator in the microcontroller. In response to the clock request signal, the clock generator reactivates one or more oscillator sources. The clock generator resumes clock generation only for the one or more requesting peripheral modules, keeping power consumption in the microcontroller to a minimum and not disturbing other modules in the microcontroller.

20 Claims, 5 Drawing Sheets

MICROCONTROLLER WITH CLOCK GENERATOR FOR SUPPLYING ACTIVATED CLOCK SIGNAL TO REQUESTING MODULE TO CONSERVE POWER

TECHNICAL FIELD

This subject matter is generally related to power consumption in microcontrollers, and more particularly to a means and method for clock control in low-power operating modes.

BACKGROUND

Low power consumption is an increasingly important parameter for microcontroller systems. The active power consumption in a microcontroller system is normally dominated by switching activity in the circuit and is proportional to the clock frequency applied to digital logic. Analog modules also contribute a substantially fixed current consumption, which can dominate at low frequencies or in low-power modes. Clocked peripheral modules in the microcontroller system are typically unavailable in ultra-low power, unclocked sleep modes, forcing applications to rely on higher-power clocked modes.

Conventional power reduction solutions for saving power in a microcontroller require that the clock to the Central Processing Unit (CPU) or peripheral modules be switched off, typically by implementing one or more sleep modes in the microcontroller. This solution can be extended until all clocks and analog modules have been switched off, and only leakage current remains, which is typically several orders of magnitude less than active current. The disadvantage of this conventional approach is that the functionality of the device is reduced, since most peripherals are designed to operate with a clock running.

SUMMARY

The disclosed implementations provide for power reduction in microcontrollers by reactivating a clock in the microcontroller for one or more peripheral modules in response to an internal or external trigger event, thus allowing the one or more peripheral modules to respond to events while operating in a low-power sleep mode. In some implementations, one or more peripheral modules in a microcontroller provide a clock request signal to a clock generator in the microcontroller. In response to the clock request signal, the clock generator reactivates one or more oscillator sources. The clock generator resumes clock generation only for the one or more requesting peripheral modules, keeping power consumption in the microcontroller to a minimum and not disturbing other modules in the microcontroller.

The disclosed power reduction scheme provides several advantages over conventional power reduction techniques. The disclosed power reduction scheme allows peripheral modules in a microcontroller system to remain responsive to ultra-low power sleep modes, resulting in applications using less power. The disclosed power reduction scheme can be used with most existing peripheral modules. The disclosed power reduction scheme has low implementation cost and complexity.

DETAILED DESCRIPTION

System Overview

Figure 1:
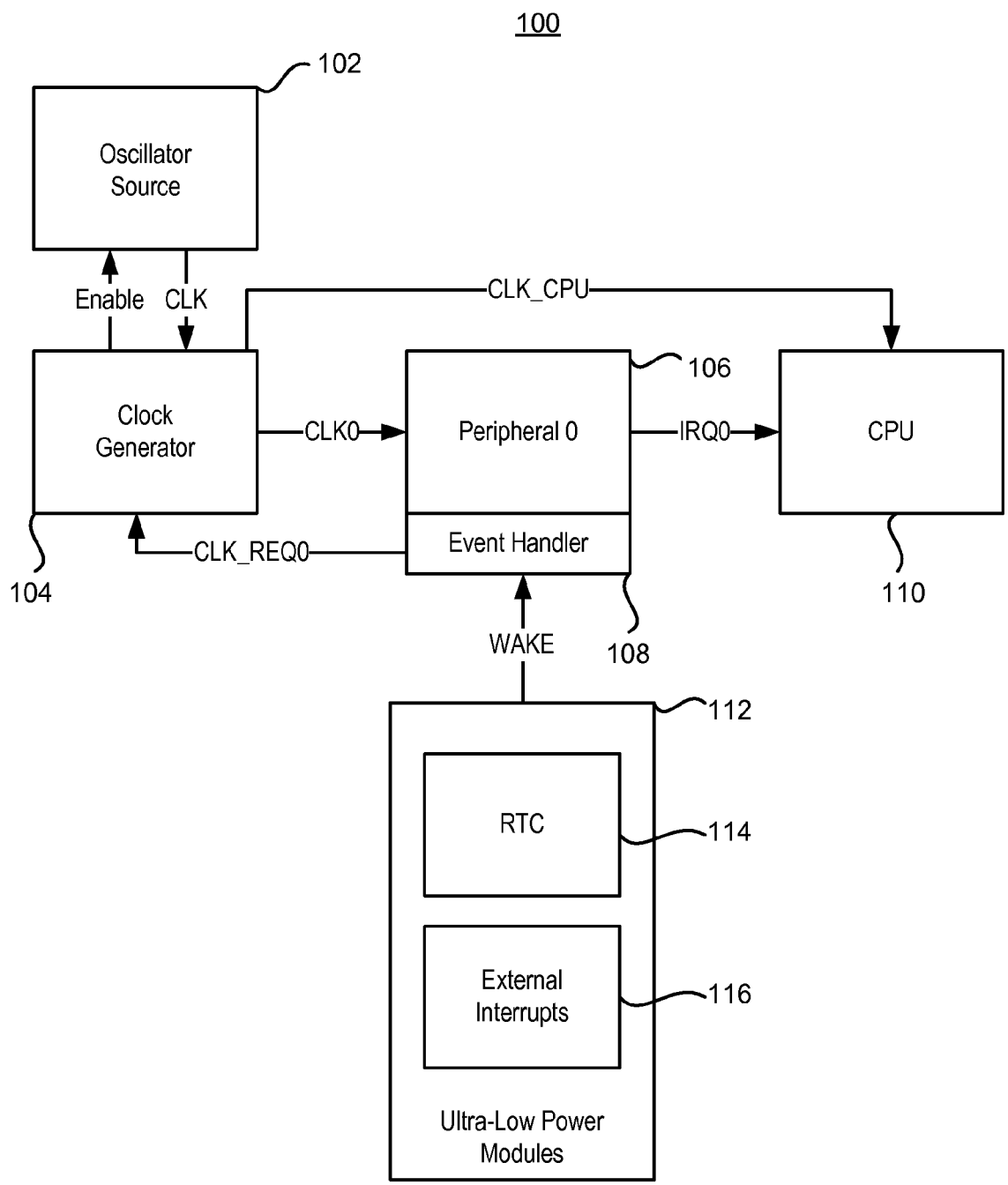
FIG. 1 is a block diagram of an example microcontroller system implementing clock control in low-power operating modes.

FIG. 1 is a block diagram of an example microcontroller system 100 implementing clock control in low-power operating modes. In some implementations, the system 100 can include oscillator source 102, clock generator 104, one or more peripheral modules 106 (only one peripheral module is shown), event handler 108, CPU 110, one or more ultra-low power modules 112, real time counter (RTC) 114 and one or more external interrupts 116.

Clock generator 104 controls (e.g., enables) oscillator source 102, which produces a source clock (e.g., CLK_CPU) for CPU 110 and source clocks (e.g., CLK0) for one or more peripheral modules 106 (hereafter also referred to as "peripherals"). Oscillator source 102 can be any type of oscillator source, including but not limited to a high-speed crystal oscillator, an internal resistive-capacitive (RC) oscillator and a phase locked loop (PLL).

The source clock for CPU 110 and the source clocks for peripheral modules 106 can be stopped in a low-power sleep mode, allowing extremely low-power consumption by microcontroller system 100. While operating in low-power sleep mode, event handler 108 allows clocked peripherals 106 to respond to internal and/or external events when peripheral clocks are stopped. In some implementations, event handler 108 includes circuitry that can be added to each peripheral module 106 and to clock generator 104 to facilitate the generating, sending and receiving of trigger events and clock requests.

In ultra low-power mode, a given peripheral module 106 (e.g., peripheral module 0) can send a WAKE signal to event handler 108 to indicate that the peripheral module 106 requests a clock to run an application and/or perform an operation. Responsive to the WAKE signal, event handler 108 sends a clock request signal (e.g., CLK_REQ0) to clock generator 104. Responsive to the clock request signal, clock generator 104 controls or enables oscillator source 102 to provide a source clock to clock generator 104. The source clock is used by clock generator 104 to generate a clock having a desired frequency for the requesting peripheral module 106 (e.g., peripheral module 0). In some implementations, the clock generator includes circuitry (e.g., an amplifier, clock divide circuit) for operating on the source clock provided by the oscillator source 102 to provide a clock for the requesting peripheral module having desired characteristics (e.g., a desired frequency).

Peripheral module 106 can use the clock to perform an operation. When the operation is completed, peripheral module 106 can wake CPU 110 using an interrupt signal (IRQ0). Since oscillator source 102 is already running, all clocks in microcontroller system 100 can be activated rapidly.

Figure 2:
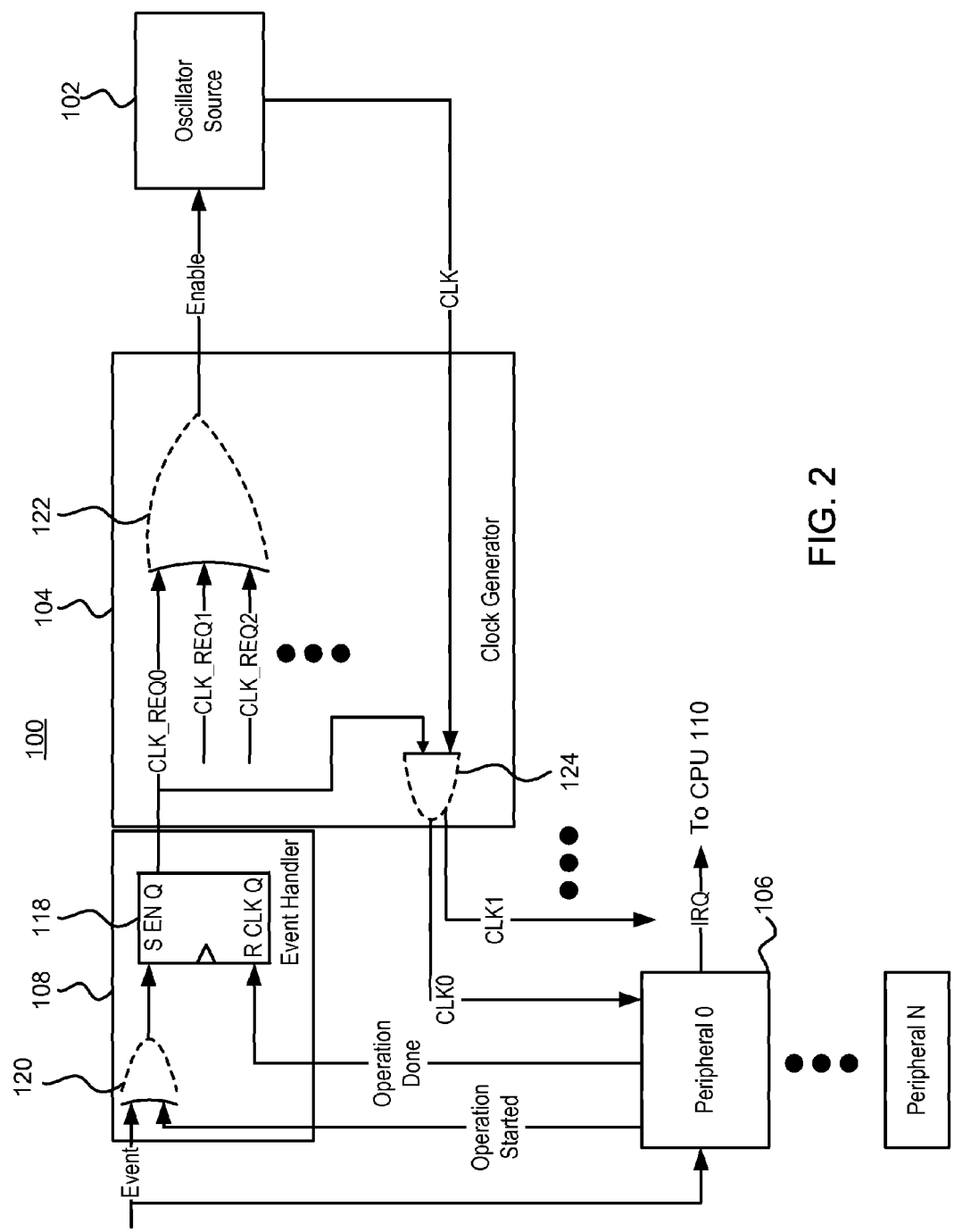
FIG. 2 is a conceptual block diagram illustrating the use of asynchronous logic in the microcontroller system of FIG. 1.

FIG. 2 is a conceptual block diagram illustrating the use of asynchronous logic in microcontroller system 100 of FIG. 1. FIG. 2 illustrates clock control functions used by system 100 to reduce power consumption. The clock control functions can be implemented using a variety of configurations and circuit devices. In some implementations, microcontroller system 100 functions related to power reduction can be conceptually described by oscillator source 102, clock generator 104, peripheral module 106 and event handler 108. Event handler 108 functions can be conceptually described by flip flop 118 (e.g., SR flip flop) and OR gate 120. Clock generator 104 functions can be conceptually described by gate 122 and gate 124.

In ultra-low sleep mode, an internal or external trigger event can be received by peripheral 106 and event handler 108. The trigger event requires peripheral 106 to perform an operation. Since peripheral 106 is a clocked peripheral, and the microcontroller system 100 is in sleep mode, oscillator source 102 and clock generator are reactivated to generate the clock for peripheral 106. In conventional systems, all of the source clocks for all peripheral modules and the CPU are reactivated, even if only a single peripheral module is requesting a clock. This results in a unnecessary power consumption. For system 100, however, only the requesting peripheral 106 will receive a clock, resulting in reduced power consumption.

In some implementations, event handler 108 is an asynchronous logic block which can be described in hardware description language (e.g., Register Transfer language (RTL)), along with circuitry for the peripheral module 106. Event handler 108 registers when an event occurs. The registration triggers a clock request signal (CLK_REQ) to clock generator 104, which indicates that peripheral 106 (Peripheral 0) requires its clock to be operating. In the example configuration shown, the event signal is input into OR gate 120, together with an OPERATION_STARTED signal generated by peripheral 106 to indicate that peripheral 106 is using its clock. Thus, a trigger event or operation of peripheral 106 sets flip-flop 118. The output of flip-flop 118 is CLK_REQ0 for peripheral module 106. CLK_REQ0 is input into AND gate 124, together with CLK from oscillator source 102. When both signals are asserted high (e.g., logic '1'), CLK0 is provided to peripheral 106. Note that the asynchronous logic block shown in FIG. 2 can be extended to any number of clocked peripheral modules.

Clock generator 104 is extended with an asynchronous logic block similar to event handler 108, which ensures that a currently selected oscillator source 102 is reactivated. Clock generator 104 resumes clock generation, but only for the requesting peripheral 106, keeping power consumption to a minimum, and not disturbing other modules in system 100. In the example configuration shown, OR gate 122 in clock generator 104 receives clock request signals from event handler 108 and generates an ENABLE signal in response. The ENABLE signal is received by oscillator source 102 and causes oscillator source 102 to reactivate and provide CLK.

After CLK0 is reactivated, peripheral 106 can resume operation. During this time, one or more signals to event handler 108 can be asserted and/or negated to indicate that CLK0 is being used. For example, an OPERATION_STARTED signal can be asserted and an OPERATION_DONE signal can be negated to indicate that peripheral 0 has started an operation and is using CLK0. After the operation is completed, peripheral 106 can wake CPU 110 with an interrupt signal (IRQ), which can activate all clocks rapidly since oscillator source 102 is already running. Alternatively, if the result of the operation does not produce an interrupt, peripheral 106 can assert its OPERATION_DONE signal to event handler 108, which in turn negates the clock request CLK_REQ0 to clock generator 104. Clock generator 104 then removes CLK0 to peripheral 106 and disables oscillator source 102, returning system 100 back to the low-power sleep mode without ever waking up CPU 110. System 100 remains in low-power sleep mode until another trigger event occurs.

System 100 allows any number of peripheral modules to request clocks at the same time. Oscillator source 102 will be active when at least one peripheral module is requesting its clock to be started.

Example ADC Application

Figure 3:
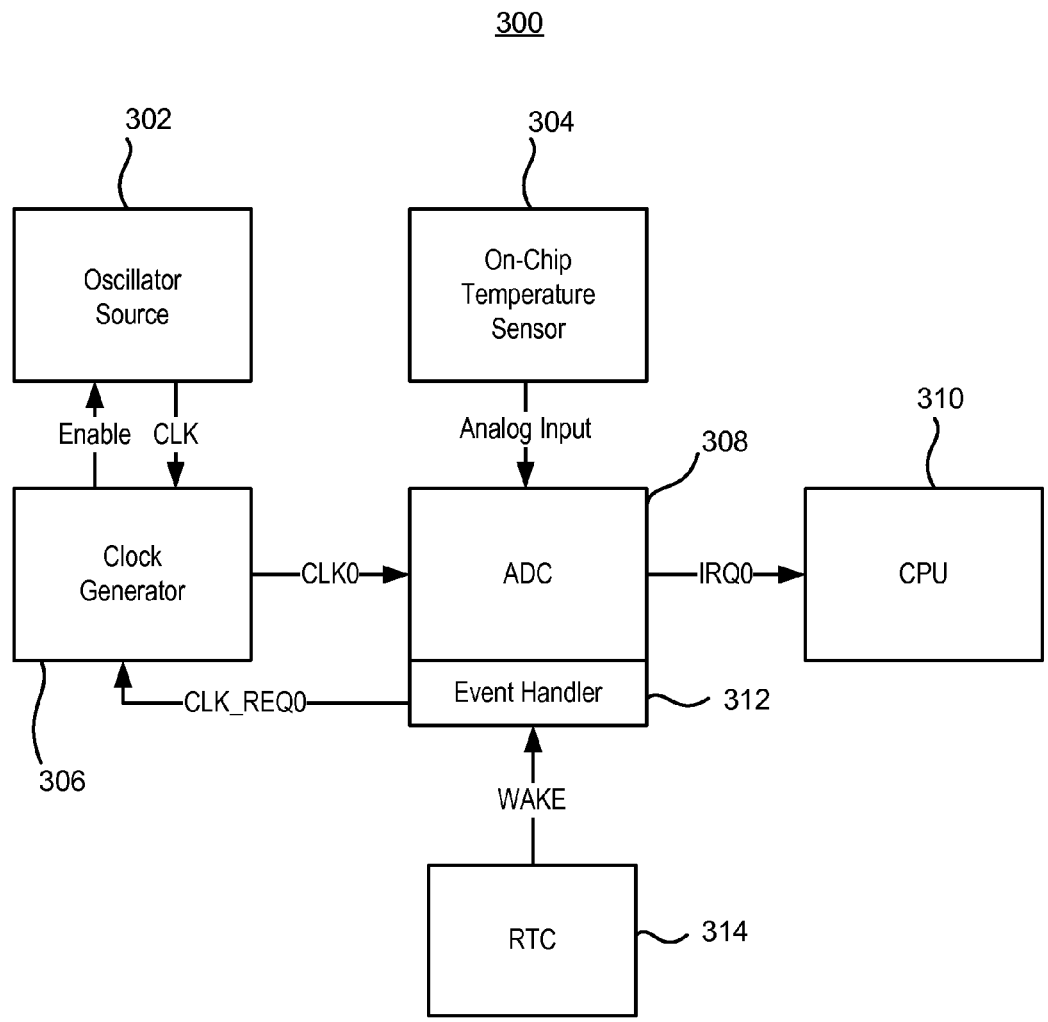
FIG. 3 is a block diagram of an example microcontroller system implementing clock control for low-power analog-to-digital converter (ADC) operation.

FIG. 3 is a block diagram of an example microcontroller system 300 implementing clock control for low-power ADC operation. The peripheral in this example is ADC 308 which is triggered by an event from RTC 314 clocked by an ultra-low power 32 KHz oscillator. ADC 308 monitors on-chip temperature sensor 304, and is set to wake up CPU 310 if the temperature is above a particular user-programmable threshold. Since temperature changes slowly, RTC 314 is set up to produce trigger events (e.g., WAKE signals) every second. The low-power mode has a power consumption of 1 uA with RTC 314 and 32 KHz running. In this example application, oscillator source 302, clock generator 306 and event handler 312 operate as described in reference to FIG. 2.

In this example application, ADC 308 has a power consumption of 500 uA while operating (including clock generator 306 and oscillator source 302), and a conversion time of 10 uA. Without event handler 312 and clock generator 306 providing asynchronous logic for clock control, ADC 308 is left operating in a responsive sleep mode, resulting in approximately 501 uA power consumption. With event handler 312 and clock generator 306 providing asynchronous logic for clock control, ADC 308 is only operational for 10 uA every second, resulting in an average power consumption of 1 uA+500 uA*10 us=1.005 uA. Thus the added power consumption of ADC 308 is negligible.

Example I2C Application

Figure 4:
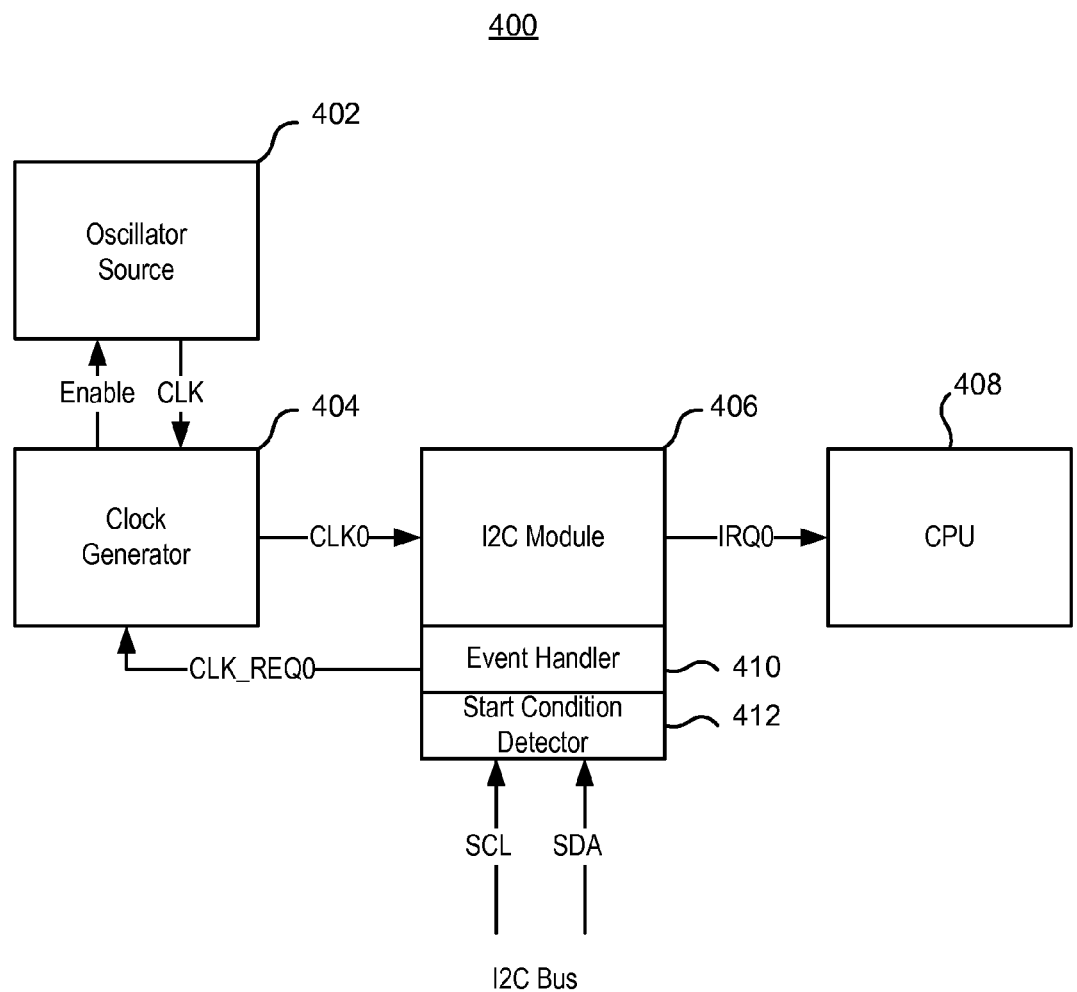
FIG. 4 is a block diagram of an example microcontroller system implementing clock control for low-power I2C address match detection.

FIG. 4 is a block diagram of an example microcontroller system 400 implementing clock control for low-power I2C address match detection. I2C (Inter-Integrated Circuit) is a multi-master serial computer bus that is used to attach low-speed peripherals to a motherboard, embedded system, or cell phone.

In this example application, a trigger event could be a start condition on an I2C bus. The start condition precedes any address on the bus, allowing the I2C slave peripheral 406 to remain unclocked until the start condition occurs. Event handler 410 can be extended with asynchronous circuitry to drive the clock low while waiting for the peripheral clock CLK0 to start. The start condition triggers event handler 410, which passes a clock request (CLK_REQ0) to clock generator 404. CLK0 is enabled once oscillator source 402 has been reactivated. I2C slave peripheral 406 signals that the clock is required until the complete address is received from the bus, and it can be detected by start condition detector 412 whether or not the address matched the address of slave peripheral 406. If the address is matched, CPU 408 is woken up, otherwise the clock request is negated or removed, and the system 400 returns to low-power mode and waits for the next start condition. In this example application, oscillator source 402, clock generator 404 and event handler 412 operate as described in reference to FIG. 2.

As shown by these examples, the disclosed power reduction scheme can allow any peripheral module to be active in low-power mode without noticeably increasing the power consumption for low-power mode or complicating software.

This allows more applications to operate in low-power sleep modes without foregoing power savings. Due to its simple design, the asynchronous logic block described above can be integrated into existing peripheral modules and clock generators without complicating their designs or requiring a change in design methodology. The asynchronous logic block can be implemented at a minimal cost in most existing microcontroller systems, making the design versatile and valuable.

Example Clock Control Process for Power Reduction

Figure 5:
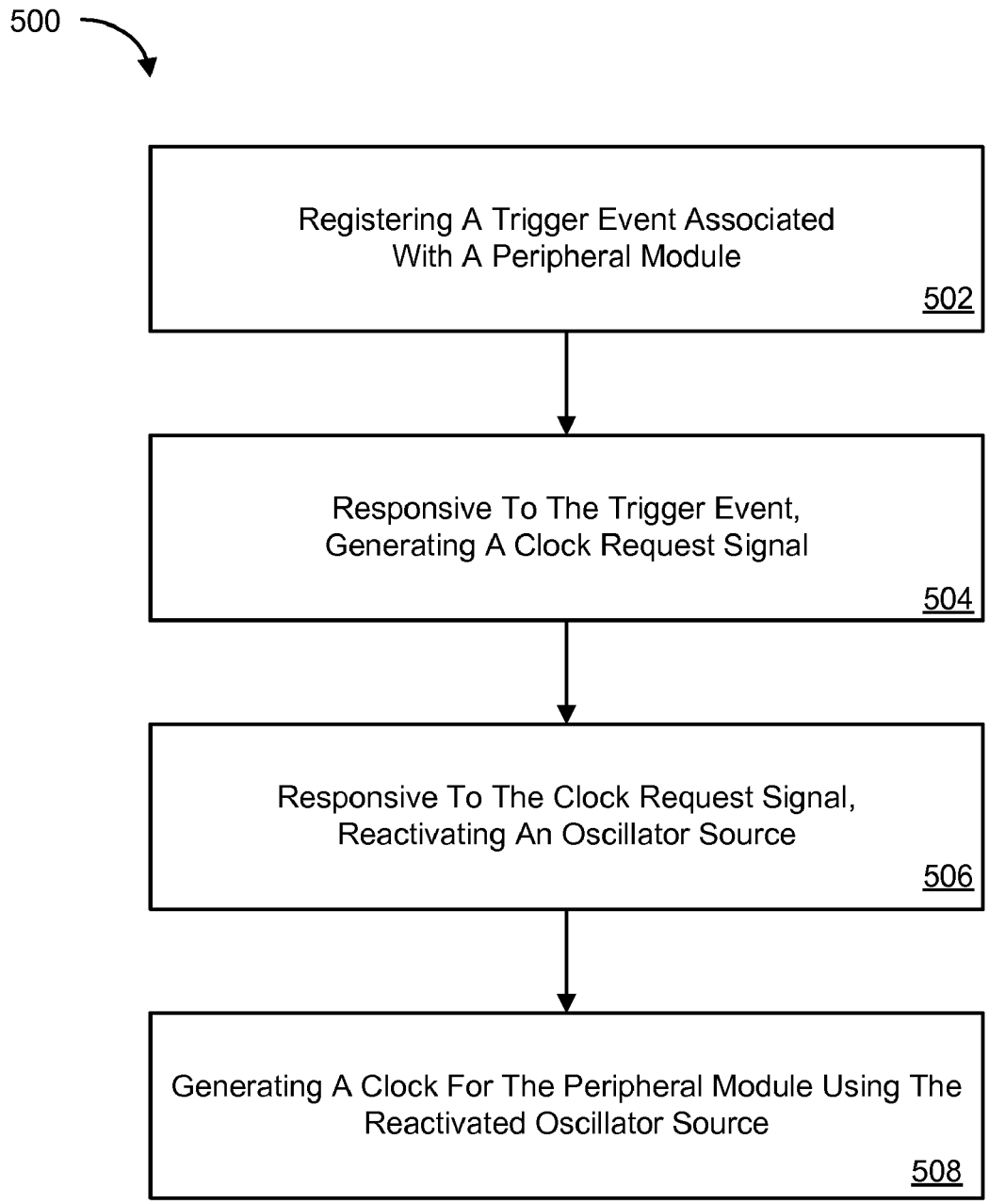
FIG. 5 is a flow diagram of an example clock control process for power reduction.

FIG. 5 is a flow diagram of an example clock control process 500 for power reduction. In some implementations, the process 500 begins when an event handler of a peripheral module registers an internal or external trigger event associated with the peripheral module (502). Responsive to the registered trigger event, a clock request signal is generated by the event handler (504) using, for example, an asynchronous logic block. Responsive to the clock request signal, an oscillator source is reactivated (506). A peripheral clock is generated for the requesting peripheral module using the reactivated clock source (508).

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method performed by a microcontroller having a number of peripheral modules capable of low-power operation, the method comprising:
    registering, by a peripheral module, a trigger event;
    responsive to the trigger event, sending to a clock generator, by an event handler associated with the peripheral module, a clock request signal for providing a clock to the peripheral module, the clock generator configured for receiving clock request signals from a plurality of the peripheral modules;
    responsive to the clock request signal, reactivating, by the clock generator, an oscillator source;
    receiving, at the clock generator, a source clock from the reactivated oscillator source; and
    generating, by the clock generator and exclusively for the peripheral module that sent the clock request signal, a clock using the source clock.

2. The method of claim 1, further comprising:
    applying the clock to the peripheral module to enable the peripheral module to perform an operation;
    determining when the operation is completed; and
    responsive to operation completing, negating the clock request signal.

3. The method of claim 1, wherein generating a clock request signal comprises reactivating the clock generator to generate the clock request signal.

4. The method of claim 2, wherein applying the clock to the peripheral module comprises:
    applying the clock to the peripheral module without applying the clock to an additional peripheral module that is in a sleep mode such that the additional peripheral module remains in sleep mode, wherein the sleep mode is associated with lower power consumption compared to a normal mode.

5. The method of claim 2, further comprising:
    responsive to the operation completing, sending an interrupt signal from the peripheral module to a central processing unit (CPU); and
    based on the interrupt signal, waking the CPU from a sleep mode, wherein the sleep mode is associated with lower power consumption compared to a normal mode.

6. A microcontroller system comprising:
    an oscillator source operable for generating a source clock;
    a clock generator coupled to the oscillator source and operable for generating a peripheral clock based on the source clock, where the oscillator source is activated by the clock generator in response to a clock request signal received at the clock generator, the clock generator configured for receiving clock request signals from a plurality of peripheral modules; and
    peripheral modules coupled to the clock generator, wherein a peripheral module includes an event handler module configured for generating a clock request signal in response to a trigger event detected at the peripheral module and sending the clock request signal to the clock generator, the peripheral module operable for receiving from the clock generator a peripheral clock generated exclusively for the peripheral module based on the clock request signal.

7. The microcontroller system of claim 6, further comprising:
    a processor coupled to the peripheral module and configured for receiving an interrupt signal from the peripheral module when the peripheral module completes an operation.

8. The microcontroller system of claim 6, wherein circuitry at the peripheral module for detecting a trigger event includes asynchronous logic.

9. The microcontroller system of claim 6, wherein circuitry at the peripheral module for detecting a trigger event is operable for detecting when an operation performed by the peripheral module is done, and wherein the circuitry negates the clock request signal in response to the detecting.

10. The microcontroller system of claim 6, wherein the peripheral module is an analog-to-digital converter.

11. The microcontroller system of claim 6, wherein the peripheral module performs bus address match detection.

12. The microcontroller system of claim 11, wherein the peripheral module includes an Inter-Integrated Circuit (I2C) bus.

13. The microcontroller system of claim 6, wherein at least one of the oscillator source, the clock generator and the peripheral module is reactivated from a sleep mode based on the trigger event, wherein the sleep mode is associated with lower power consumption compared to a normal mode.

14. The microcontroller system of claim 13, comprising an additional peripheral module, wherein the additional peripheral module is not reactivated from the sleep mode based on the trigger event detected by the peripheral module.

15. The microcontroller system of claim 6, wherein the event handler module is configured using a hardware description language.

16. The microcontroller system of claim 15, wherein the hardware description language includes Register Transfer Language (RTL).

17. A computer program product, embodied in a non-transitory computer-readable medium and including instructions executable by a processor and operable to cause the processor to perform functions comprising:
  registering, by a peripheral module, a trigger event;
  responsive to the trigger event, sending to a clock generator, by an event handler associated with the peripheral module, a clock request signal for providing a clock to the peripheral module, the clock generator configured for receiving clock request signals from a plurality of the peripheral modules;
  responsive to the clock request signal, reactivating, by the clock generator, an oscillator source;
  receiving, at the clock generator, a source clock from the reactivated oscillator source; and
  generating, by the clock generator and exclusively for the peripheral module that sent the clock request signal, a clock using the source clock.

18. The computer program product of claim 17, comprising:
  applying the clock to the peripheral module to enable the peripheral module to perform an operation;
  determining when the operation is completed; and
  responsive to operation completing, negating the clock request signal.

19. The computer program product of claim 18, wherein applying the clock to the peripheral module comprises:
  applying the clock to the peripheral module without applying the clock to an additional peripheral module that is in a sleep mode such that the additional peripheral module remains in sleep mode, wherein the sleep mode is associated with lower power consumption compared to a normal mode.

20. The computer program product of claim 18, further comprising:
  responsive to the operation completing, sending an interrupt signal from the peripheral module to a central processing unit (CPU); and
  based on the interrupt signal, waking the CPU from a sleep mode, wherein the sleep mode is associated with lower power consumption compared to a normal mode.

* * * * *